(12) United States Patent
Chung et al.

(10) Patent No.: US 9,515,487 B2
(45) Date of Patent: Dec. 6, 2016

(54) POWER FLOW CONTROL APPARATUS

(71) Applicants: City University of Hong Kong, Kowloon (HK); e.Energy Double Tree Limited, Kowloon (HK)

(72) Inventors: Shu Hung Henry Chung, Mid-Levels (HK); Sui Pung Cheung, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 557 days.

(21) Appl. No.: 13/836,213

(22) Filed: Mar. 15, 2013

(65) Prior Publication Data

US 2014/0266145 A1    Sep. 18, 2014

(51) Int. Cl.
*G05F 1/00* (2006.01)
*H02J 3/26* (2006.01)
*H02J 3/18* (2006.01)

(52) U.S. Cl.
CPC ............. *H02J 3/26* (2013.01); *H02J 3/1814* (2013.01); *Y02E 40/18* (2013.01); *Y02E 40/50* (2013.01)

(58) Field of Classification Search
CPC ................................ H02J 3/1814; H02J 3/26
USPC .......... 323/271, 272; 307/17, 24, 31, 33, 42, 307/64, 113, 125, 126
See application file for complete search history.

(56) References Cited

U.S. PATENT DOCUMENTS 5,526,252 A * 6/1996 Erdman .................. H02M 1/12
                                                        323/207
9,041,504 B2 * 5/2015 Helmreich .......... H02M 3/1584
                                                        323/271

\* cited by examiner

*Primary Examiner* — Adolf Berhane
*Assistant Examiner* — Afework Demisse
(74) *Attorney, Agent, or Firm* — Renner Kenner Greive Bobak Taylor & Weber

(57) ABSTRACT

A power flow control apparatus comprising a current distribution circuit arranged to distribute an input current into a plurality of branches such that the input current is distributed into a plurality of individual branch currents; wherein each of the plurality of branches includes an inductive arrangement arranged to form an inductive coupling with an associated inductive arrangement of at least one other associated branch, and a plurality of compensator units in electrical communication with the plurality of branches, wherein each compensator unit is arranged to deliver a branch compensating voltage relative to the branch current.

21 Claims, 10 Drawing Sheets

POWER FLOW CONTROL APPARATUS

TECHNICAL FIELD

The present invention relates to a power flow control apparatus and particularly, although not exclusively, to a compensator circuit for regulating power flow in a two machine system.

BACKGROUND

Various power flow control techniques for regulating power flow and transfer over a transmission line have been reported in the literature.

For example, a flexible alternating current transmission system (FACTS) can be used for the AC transmission of electrical energy. FACTS are generally power electronics based systems that can enhance controllability and increase power transfer capability of a network. In some applications, they can also improve power oscillation damping on power grids.

However, simple FACTS systems often fail to meet the required power transfer capacity for wide ratings diversity of the local generators and loads in distributed generation systems. Thus, a more flexible means of managing a wide range of power transfer requirements is desired.

SUMMARY OF THE INVENTION

In accordance with a first aspect of the present invention, there is provided a power flow control apparatus comprising a current distribution circuit arranged to distribute an input current into a plurality of branches such that the input current is distributed into a plurality of individual branch currents; wherein each of the plurality of branches includes an inductive arrangement arranged to form an inductive coupling with an associated inductive arrangement of at least one other associated branch; and a plurality of compensator units in electrical communication with the plurality of branches, wherein each compensator unit is arranged to deliver a branch compensating voltage relative to the branch current.

In an embodiment of the first aspect, the compensator units are disposed downstream of the current distribution circuit.

In an embodiment of the first aspect, each compensator unit is arranged to regulate its branch compensating voltage.

In an embodiment of the first aspect, each compensator unit is further arranged to automatically regulate its branch compensating voltage in response to a command.

In an embodiment of the first aspect, the power flow control apparatus is further arranged to provide an output voltage based on the branch compensating voltages of the compensator units.

In an embodiment of the first aspect, the input current is a current on a transmission line having at least one current source.

In an embodiment of the first aspect, the current distribution circuit distributes the input current into the plurality of individual branch currents based on at least one predetermined ratio of the current distribution circuit.

In an embodiment of the first aspect, the inductive arrangement of each branch of the current distribution circuit comprises a first coil and a second coil.

In an embodiment of the first aspect, the at least one predetermined ratio of the current distribution circuit is associated with a number of turns of the first coil and a number of turns of the second coil.

In an embodiment of the first aspect, the first coil of each branch is inductively coupled with the second coil of an adjacent branch.

In an embodiment of the first aspect, the first coil of each branch and the second coil of an adjacent branch together define a transformer unit.

In an embodiment of the first aspect, the first coils are primary coils of the transformer units and the second coils are secondary coils of the transformer units.

In an embodiment of the first aspect, the primary coil and the secondary coil of each transformer unit of the current distribution circuit are disposed in adjacent branches.

In an embodiment of the first aspect, the primary coil of each transformer unit of the current distribution circuit is disposed on the same branch with the secondary coil of an adjacent transformer unit of the current distribution circuit.

In an embodiment of the first aspect, the primary coils each comprises a first number of turns of coils and the secondary coils each comprises a second number of turns of coils.

In an embodiment of the first aspect, each transformer unit of the current distribution circuit has a turn ratio defined by the first number of turns of coils of the primary coil and the second number of turns of coils of the secondary coil.

In an embodiment of the first aspect, the at least one predetermined ratio of the current distribution circuit is determined by at least one of the turn ratio of at least one of the transformer units.

In an embodiment of the first aspect, a summation of the individual branch current of each of the plurality of individual branches of the current distribution circuit is substantially equal to the input current.

In an embodiment of the first aspect, the compensator units are static synchronous series compensators (SSSC) each comprising a voltage source converter.

In an embodiment of the first aspect, each static synchronous series compensator is arranged to provide the branch compensating voltage.

In an embodiment of the first aspect, each static synchronous series compensator is further arranged to regulate its branch compensating voltage.

In an embodiment of the first aspect, each static synchronous series compensator is further arranged to automatically regulate its branch compensating voltage in response to a command.

In an embodiment of the first aspect, the power flow control apparatus is arranged to provide an output voltage based on the branch compensating voltages of the static synchronous series compensators.

In an embodiment of the first aspect, the number of transformer units equals the number of branches.

In an embodiment of the first aspect, the number of compensator units equals the number of branches.

In an embodiment of the first aspect, the number of compensator units equals the number of transformer units.

In an embodiment of the first aspect, the transformer units are connected in a daisy-chained manner.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 4:
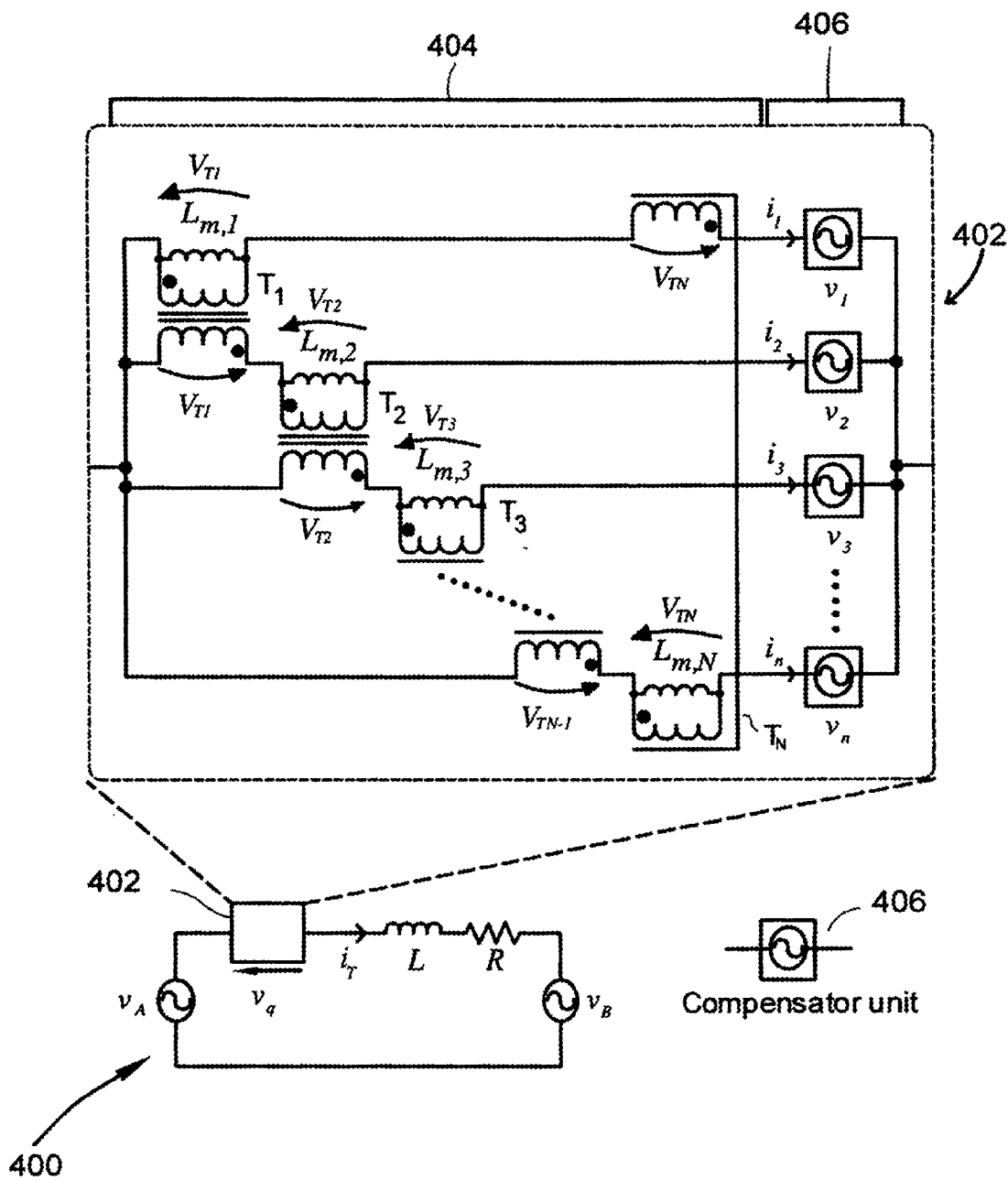
FIG. 4 is a diagram showing a power flow control apparatus in accordance with one embodiment of the present invention being disposed in an elementary two-machine system.

With reference to FIG. 4, there is illustrated an embodiment of a power flow control apparatus comprising a current distribution circuit arranged to distribute an input current into a plurality of branches such that the input current is distributed into a plurality of individual branch currents; wherein each of the plurality of branches includes an inductive arrangement arranged to form an inductive coupling with an associated inductive arrangement of at least one other associated branch; and a plurality of compensator units in electrical communication with the plurality of branches, wherein each compensator unit is arranged to deliver a branch compensating voltage relative to the branch current.

In the following description, an embodiment of the current distribution circuit in the power flow control apparatus of the present invention will first be described. Then, the modelling, design and analysis of the power flow control apparatus in one embodiment of the present invention will be provided. Lastly, experimental results of the power flow control apparatus will be presented.

Figure 1:
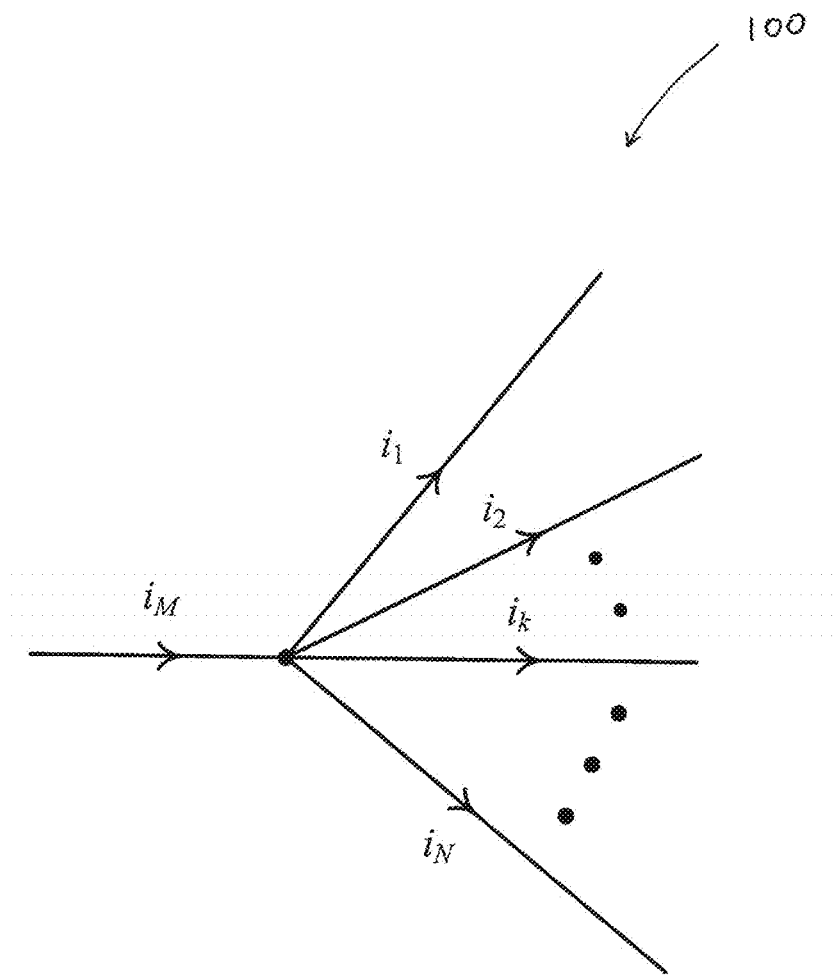
FIG. 1 is a diagram illustrating a simplified current distribution scheme.

Referring now to FIG. 1, there is shown a diagram illustrating a simplified current distribution scheme 100. The inventors through their research, trials and experimentation have devised that an alternating electric current can be divided into a plurality of branches based a plurality of predefined parameters. For example, as shown in FIG. 1, a main current $i_M$ is shared among N branches. The currents in the branches are denoted as $i_1, i_2, \ldots, i_k, \ldots, i_N$. More specifically, the main current is related to the branch currents by the following equation:

$$i_1 + i_2 + \ldots + i_k + \ldots + i_N = i_M \qquad (1).$$

Preferably, the currents are alternating current (AC). In some other embodiments, however, the currents may also be direct currents (DC) in another embodiment.

Figure 2:
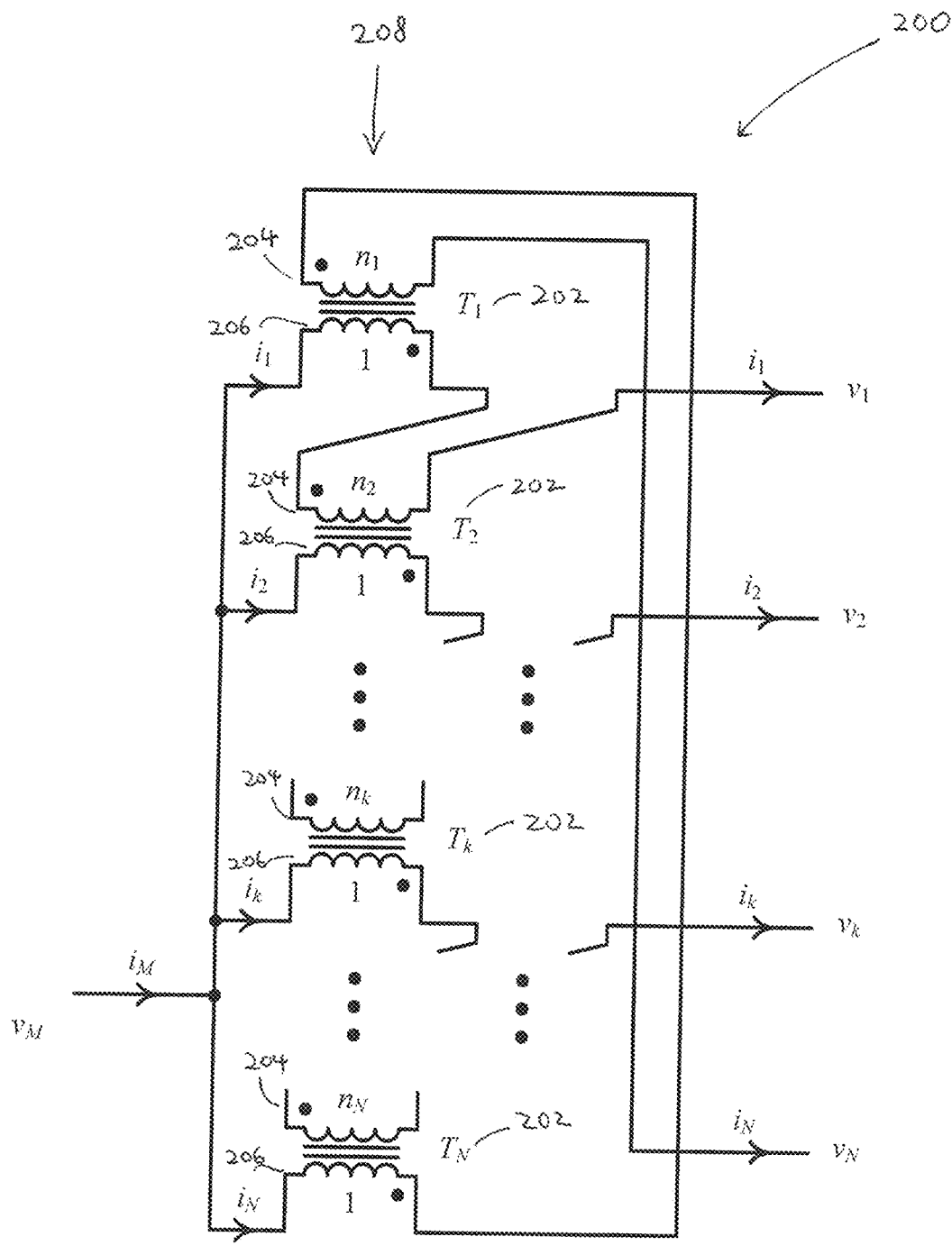
FIG. 2 is a diagram illustrating a current distribution circuit of a power flow control apparatus in accordance with one embodiment of the present invention.

With reference to FIG. 2, there is illustrated a current distribution circuit 200 of a power flow control apparatus in accordance with one embodiment of the present invention. In this embodiment, the current distribution circuit 200 is constructed by a number of magnetically coupled inductive components (transformers or transformer units) 202 connected in a daisy chained manner 208. As shown in FIG. 2, the primary coil 206 and the secondary coil 204 of each transformer unit 202 are disposed in adjacent branches. In particular, the primary coil 206 of each transformer unit 202 is disposed in the same branch as the secondary coil 204 of an adjacent transformer unit 202. Preferably, the number of the transformers 202 required is equal to the number of branches.

In this embodiment, the current flowing through each branch is determined by the turns ratios (ratio of the number of turns of coils in the primary coil 206 to the number of turns of coils in the secondary coil 204) of the transformers 202, i.e. $n_1, n_2, \ldots, n_k, \ldots, n_N$. Ideally, all transformers 202 have infinite magnetizing inductances. Accordingly, the currents in the branches can be expressed as follows:

$$i_1 = n_1 i_N \qquad (2)$$

$$i_2 = n_2 i_1 \qquad (3)$$

$$\vdots$$

$$i_k = n_k i_{k-1} \qquad (4)$$

$$\vdots$$

$$i_N = n_N i_{N-1}. \qquad (5)$$

Thus, by substituting equations (2) to (5) into equation (1), it can be shown that $$i_k = \frac{\prod_{j=1}^{k} n_j}{n_1 + n_1 n_2 + \ldots + n_1 n_2 \ldots n_k + \ldots + n_1 n_2 \ldots n_N} i_M. \qquad (6)$$

In other words, equation (6) shows that the current in any one of the branches will depend on the turn ratios of the transformers 202 of the current distribution circuit 200. In particular, an advantage of this embodiment is that the current division is substantially independent of the branch voltages $v_1, v_2, \ldots, v_k, \ldots, v_N$, and $v_M$.

Furthermore, in one particular embodiment, when $n_1 = n_2 = \ldots = n_k = \ldots = n_N = 1$, $$i_1 = i_2 = \ldots = i_k = \ldots = i_N = \frac{1}{N} i_M. \qquad (7)$$

This is advantageous in that the current $i_M$ is equally shared by the branches.

Figure 3:
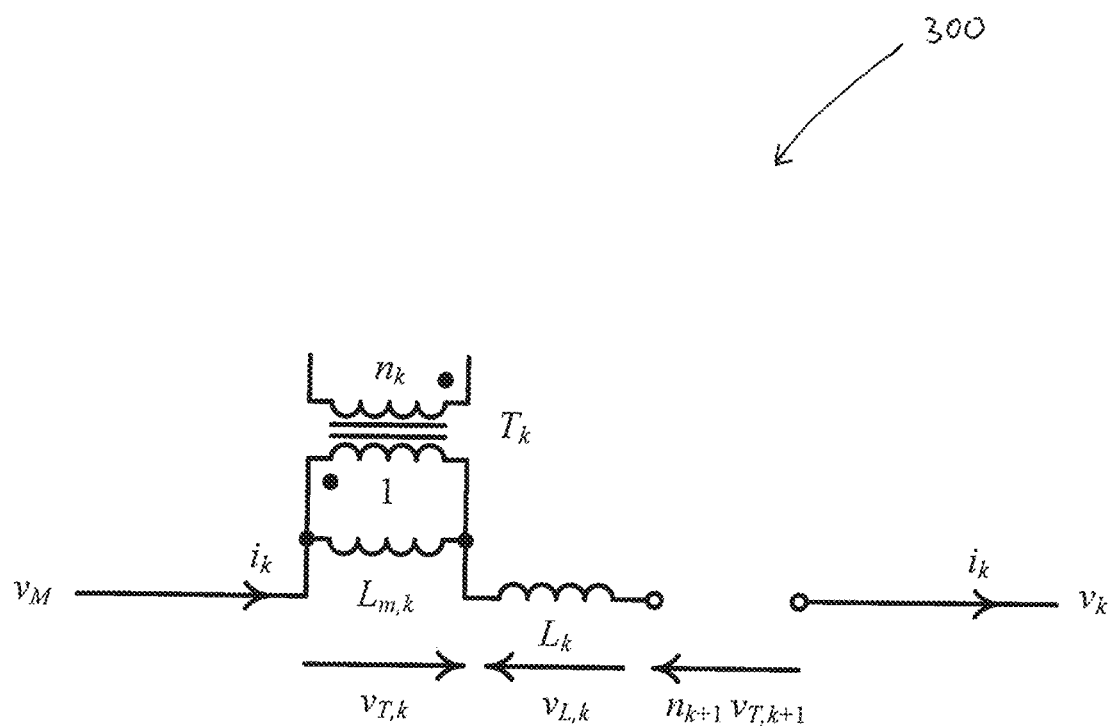
FIG. 3 is a diagram illustrating a branch of the current distribution circuit of FIG. 2.

With reference to FIG. 3, there is shown a branch 300 of the current distribution circuit of FIG. 2. In reality, practical transformers may have finite magnetizing inductance, leakage inductance, and resistance. FIG. 3 shows the equivalent circuit of the k-th branch, in which $L_{m,k}$ is the magnetizing inductance of the transformer $T_k$ and $L_k$ is the equivalent series inductance of the branch. Preferably, $L_k$ includes the leakage inductance of the transformer. In some embodiments, the resistance can be neglected.

By applying the Kirchhoff's voltage law to the branch 300, it can be shown that $$v_M + v_{T,k} - v_{L,k} - n_{k+1}v_{T,k+1} - v_k = 0 \qquad (8)$$

in which $v_{T,k}$ is the voltage across the magnetizing inductance $L_{m,k}$ of the transformer $T_k$, $v_{L,k}$ is the voltage across the equivalent series inductance $L_k$ of the branch 300, $v_M$ is the voltage at the input, $n_k$ is the turn ratio of the transformer $T_k$ and $v_k$ is the voltage at the output of the branch 300.

Accordingly, by using equation (8) for the N branches, it can be shown that the voltages $v_{T,k}$, $v_{L,k}$, $v_M$, and $v_k$ are related to the turn ratio $n_k$ of the transformer $T_k$ by the following:

$$\begin{bmatrix} -1 & n_2 & 0 & 0 & \ldots & 0 & 0 \\ 0 & -1 & n_3 & 0 & 0 & \ldots & 0 \\ \vdots & \vdots & \vdots & \ddots & \ddots & \ddots & \vdots \\ 0 & 0 & \ldots & -1 & n_k & \ldots & 0 \\ \vdots & \vdots & \ddots & \ddots & \ddots & \ddots & \vdots \\ 0 & 0 & \ldots & 0 & \ldots & -1 & n_N \\ n_1 & 0 & \ldots & 0 & \ldots & 0 & -1 \end{bmatrix} \begin{bmatrix} v_{T,1} \\ v_{T,2} \\ \vdots \\ v_{T,k} \\ \vdots \\ v_{T,N-1} \\ v_{T,N} \end{bmatrix} = \begin{bmatrix} v_M - v_1 \\ v_M - v_2 \\ \vdots \\ v_M - v_k \\ \vdots \\ v_M - v_{N-1} \\ v_M - v_N \end{bmatrix} - \begin{bmatrix} v_{L,1} \\ v_{L,2} \\ \vdots \\ v_{L,k} \\ \vdots \\ v_{L,N-1} \\ v_{L,N} \end{bmatrix} \qquad (9)$$

On the other hand, in this embodiment, the voltage $v_{L,k}$ across the equivalent series inductance $L_k$ of the k-th branch can be expressed as:

$$v_{L,k} = sL_k i_k \qquad (10)$$

where $s = j\omega$ is the Laplace operator and $\omega$ is the operating frequency.

By using equation (10) for N branches, it can be shown that $$\begin{bmatrix} v_{L,1} \\ v_{L,2} \\ \vdots \\ v_{L,k} \\ \vdots \\ v_{L,N-1} \\ v_{L,N} \end{bmatrix} = \begin{bmatrix} sL_1 & 0 & 0 & 0 & \ldots & 0 & 0 \\ 0 & sL_2 & 0 & 0 & 0 & \ldots & 0 \\ \vdots & \vdots & \vdots & \ddots & \ddots & \ddots & \vdots \\ 0 & 0 & \ldots & sL_k & 0 & \ldots & 0 \\ \vdots & \vdots & \ddots & \ddots & \ddots & \ddots & \vdots \\ 0 & 0 & \ldots & 0 & \ldots & sL_{N-1} & 0 \\ 0 & 0 & \ldots & 0 & \ldots & 0 & sL_N \end{bmatrix} \begin{bmatrix} i_1 \\ i_2 \\ \vdots \\ i_k \\ \vdots \\ i_{N-1} \\ i_N \end{bmatrix} \qquad (11)$$

Equation (11) illustrates that the voltage $v_{L,k}$ across the equivalent series inductance $L_k$ of the k-th branch is related to the current $i_k$ of the k-th branch.

In this embodiment, as illustrated above, the current among difference branches are inter-related. Furthermore, by applying the Kirchhoff's current law, it can be shown that $$-n_k i_{k-1} + i_k = -\frac{v_{T,k}}{sL_{m,k}} \qquad (12)$$

in which $n_k$ is the turn ratio of the transformer $T_k$, $i_k$ is the current in the k-th branch, $L_{m,k}$ is magnetizing inductance of the transformer $T_k$, $v_{T,k}$ is the voltage across the magnetizing inductance $L_{m,k}$ of the transformer $T_k$ and $s = j\omega$ is the Laplace operator where $\omega$ is the operating frequency. Preferably, in the above expression, when k=1, (k−1)=N.

By arranging equation (12) into matrix form, the following equation can be obtained:

$$\begin{bmatrix} 1 & 0 & 0 & 0 & \ldots & 0 & -n_1 \\ -n_2 & 1 & 0 & 0 & 0 & \ldots & 0 \\ \vdots & \vdots & \ddots & \ddots & \ddots & \ddots & \vdots \\ 0 & 0 & \ldots & -n_k & 1 & \ldots & 0 \\ \vdots & \vdots & \ddots & \ddots & \ddots & \ddots & \vdots \\ 0 & 0 & \ldots & 0 & \ldots & 1 & 0 \\ 0 & 0 & \ldots & 0 & \ldots & -n_N & 1 \end{bmatrix} \begin{bmatrix} i_1 \\ i_2 \\ \vdots \\ i_k \\ \vdots \\ i_{N-1} \\ i_N \end{bmatrix} = \qquad (13)$$

$$\begin{bmatrix} -\frac{1}{sL_{m,1}} & 0 & 0 & 0 & \ldots & 0 & 0 \\ 0 & -\frac{1}{sL_{m,2}} & 0 & 0 & 0 & \ldots & 0 \\ \vdots & \vdots & \vdots & \ddots & \ddots & \ddots & \vdots \\ 0 & 0 & \ldots & -\frac{1}{sL_{m,k}} & 0 & \ldots & 0 \\ \vdots & \vdots & \ddots & \ddots & \ddots & \ddots & \vdots \\ 0 & 0 & \ldots & 0 & \ldots & -\frac{1}{sL_{m,N-1}} & 0 \\ 0 & 0 & \ldots & 0 & \ldots & 0 & -\frac{1}{sL_{m,N}} \end{bmatrix} \begin{bmatrix} v_{T,1} \\ v_{T,2} \\ \vdots \\ v_{T,k} \\ \vdots \\ v_{T,N-1} \\ v_{T,N} \end{bmatrix}$$

As shown in equation (13), the voltage $v_{T,k}$ across the magnetizing inductance of the transformer $T_k$ is related to the current $i_k$ in the k-th branch.

In this embodiment, by further using equations (9), (11) and (13) (eliminating $v_{T,k}$ and $v_{L,k}$ from equation (9)), it can be shown that $$\begin{bmatrix} i_1 \\ i_2 \\ \vdots \\ i_k \\ \vdots \\ i_{N-1} \\ i_N \end{bmatrix} = [Y] \begin{bmatrix} v_M - v_1 \\ v_M - v_2 \\ \vdots \\ v_M - v_k \\ \vdots \\ v_M - v_{N-1} \\ v_M - v_N \end{bmatrix} \quad (14)$$

where $[Y]=[Z]^{-1}$ and $$[Z] = \begin{bmatrix} sL_{m,1} + n_2^2 sL_{m,2} + sL_1 & -n_2 sL_{m,2} & 0 & 0 & \cdots & 0 & -n_1 sL_{m,1} \\ -n_2 sL_{m,2} & sL_{m,2} + n_3^2 sL_{m,3} + sL_2 & -n_3 sL_{m,3} & 0 & 0 & \cdots & 0 \\ \vdots & \vdots & \vdots & \ddots & \ddots & \ddots & \vdots \\ 0 & 0 & \cdots & -n_k sL_{m,k} & sL_{m,k} + n_{k+1}^2 sL_{m,k+1} + sL_k & -n_{k+1} sL_{m,k+1} & 0 \\ \vdots & \vdots & \ddots & \ddots & \ddots & \ddots & \vdots \\ 0 & 0 & \cdots & 0 & \cdots & sL_{m,N-1} + n_N^2 sL_{m,N} + sL_{N-1} & 0 \\ -n_1 sL_{m,1} & 0 & \cdots & 0 & \cdots & -n_N sL_{m,N} & sL_{m,N} + n_1^2 sL_{m,1} + sL_N \end{bmatrix}$$

Equation (14) shows the relationship of the current $i_k$ in the k-th branch and the voltage difference $v_M-v_k$ across the respective branch. In a preferred embodiment, [Z] is arranged such that the current $i_k$ of the k-th branch is substantially independent of the voltage difference $v_m-v_k$ across the respective branch.

A further illustration of the current distribution circuit in one embodiment is provided as follows. In the following example, the current distribution circuit is arranged to have three branches. In the following, $v_M$, $v_1$, $v_2$, and $v_3$ are dc voltages. By arranging the magnetization inductance in each branch to be the same ($L_{m,1}=L_{m,2}=L_{m,3}=L_m$), and the equivalent series inductance in each branch to be the same ($L_1=L_2=L_3=L$), it can be shown that $$i_1(t) = \frac{L(v_M - v_1) + L_m(3v_M - v_1 - v_2 - v_3)}{L(L+3L_m)} t \quad (15)$$

$$i_2(t) = \frac{L(v_M - v_2) + L_m(3v_M - v_1 - v_2 - v_3)}{L(L+3L_m)} t \quad (16)$$

$$i_3(t) = \frac{L(v_M - v_3) + L_m(3v_M - v_1 - v_2 - v_3)}{L(L+3L_m)} t \quad (17)$$

Advantageously, in this embodiment, it can be observed that if $L_m$ is sufficiently large, the currents i(t) of the three branches will be substantially the same.

Although in the above example, the current distribution circuit is arranged to have three branches. However, in some other embodiments, the current distribution circuit may have any number of branches and the current in each branch may not necessarily have to be equal.

Referring now to FIG. 4, there shows an elementary two-machine system 400 with two voltage sources $v_A$ and $v_B$ interconnected by a lossy transmission line with resistance R and inductance L (with reactance $X_L$). A power flow control apparatus 402 in one embodiment of the present invention is connected in series with the transmission line. Preferably, the power flow control apparatus 402 comprises a current distribution circuit 404 arranged to distribute a transmission line current into a plurality of branches such that the transmission line current is distributed into a plurality of individual branch currents; wherein each of the plurality of branches includes an inductive arrangement arranged to form an inductive coupling with an associated inductive arrangement of at least one other associated branch; and a plurality of compensator units (or compensators) 406 in electrical communication with the plurality of branches, wherein each compensator unit is arranged to deliver a branch compensating voltage relative to the branch current. In particular, in a preferred embodiment, the compensator units 406 are static synchronous series compensators (SSSC) which comprises a voltage source inverter whereas the power flow control apparatus 402 comprises a multi-parallel connected static synchronous series compensators (MSSSC) architecture. Preferably, each branch has one compensator unit 406. However, in other embodiments, each branch can have more than one compensator unit 406 or some of the branches may not have any compensator units 406.

In a preferred embodiment, the power flow P between the two voltage sources $v_A$ and $v_B$ can be adjusted by controlling the output voltage $v_q$ of the power flow control apparatus 402. The transmission line current is shared among the compensator units through daisy-chained transformers $T_1$, $T_2$, ..., $T_N$. In one embodiment, the primary and secondary sides of each transformer are connected to two compensators 406. Preferably, the currents through the two connected compensators 406 are in a ratio determined by the transformer turns-ratio. In one embodiment, the number of transformers equals the number of branches.

The modelling of the two-machine system 400 with the power flow control apparatus 402 is provided as follows.

With reference to FIG. 4, the compensator current $i=[i_1\ i_2\ \ldots\ i_N]^T$ can be expressed in terms of $v_A$, $v_B$ and the compensator voltages $v=[v_1\ v_2\ \ldots\ v_N]^T$ as $$i = G[\beta(v_A - v_B) - v] \quad (18)$$

where $\beta=[1\ 1\ \ldots\ 1\ 1]^T$ and $G=\{K\ Z+(s\ L+R)[1]\}^{-1}$ in which $$K = \begin{bmatrix} 1 & 0 & \ldots & 0 & -n_N \\ -n_1 & 1 & 0 & \ldots & 0 \\ 0 & -n_2 & 1 & 0 & \vdots \\ \vdots & \ddots & \ddots & \ddots & 0 \\ 0 & \ldots & 0 & -n_{N-1} & 1 \end{bmatrix},$$

$$Y = \begin{bmatrix} sL_{m,1} & -n_1 sL_{m,1} & 0 & \ldots & 0 \\ 0 & sL_{m,2} & -n_2 sL_{m,2} & \ldots & \vdots \\ \vdots & \vdots & \ddots & \ddots & 0 \\ 0 & 0 & \ldots & \ddots & -n_{N-1} sL_{m,N-1} \\ -n_N sL_{m,N} & 0 & \ldots & 0 & sL_{m,N} \end{bmatrix}, L_{m,k}$$

is magnetizing inductance of the transformer $T_k$, $n_k$ is the turn ratio of the transformer $T_k$, $s=j\omega$ is the Laplace operator with $\omega$ being the operating frequency, L is the inductance of the transmission line, R is the resistance of the transmission line and [1] is N×N unity matrix.

Moreover, a describing function showing the small-signal response of the compensator output (compensating) currents to the variations in the compensator output (compensating) voltages is given by $$\Delta i(s) = -G\Delta v(s) \qquad (19)$$

where $\Delta i(s)$ and $\Delta v(s)$ are the small-signal variations in i and v respectively.

The modelling of a compensator unit 406 of the power flow control apparatus 402 is provided below.

Figure 5:
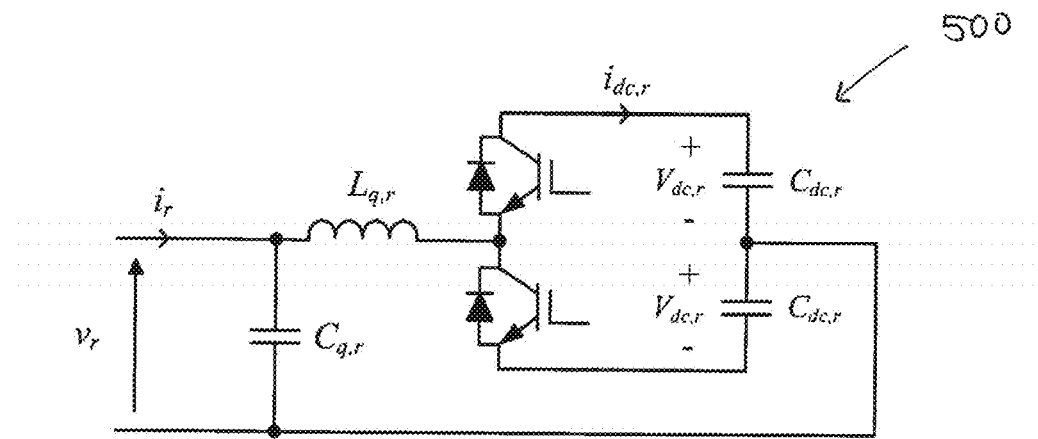
FIG. 5 is a diagram of a compensator unit of the power flow control apparatus of FIG. 4.
Figure 6A:
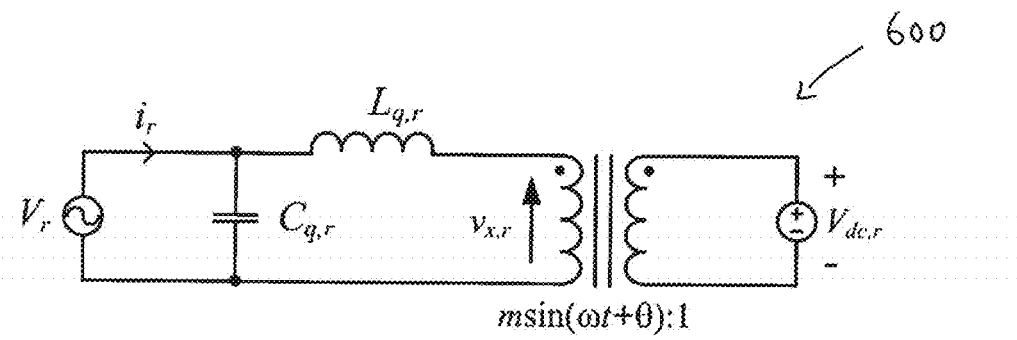
FIG. 6A is a diagram of a steady state equivalent circuit of the compensator unit of FIG. 5.
Figure 6B:
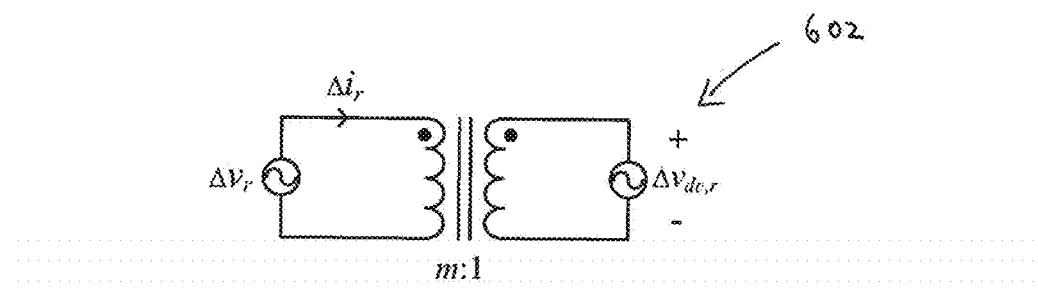
FIG. 6B is diagram of an a.c. small signal equivalent circuit of the compensator unit of FIG. 5.

FIG. 5 shows the circuit schematic 500 of the r-th compensator unit 406 in FIG. 4. FIGS. 6A and 6B show respectively a steady-state low-frequency model 600 and an a.c. small-signal model 602 of the compensator unit 406. With reference to FIG. 6A, it can be shown that $$v_r(t) = L_{q,r}\frac{di_r(t)}{dt} + mv_{dc,r}(t)\sin[\omega t + \theta_r(t)] \qquad (20)$$

$$i_{dc,r}(t) = \frac{1}{2}mi_r(t)\sin[\omega t + \theta_r(t)] \qquad (21)$$

where $v_{dc,r}(t)$ is voltage across the dc capacitor $C_{dc,r}$.

By injecting small-signal perturbations into $v_r(t)$, $i_r(t)$, $v_{dc,r}(t)$, and $\theta(t)$ in equations (20) and (21), it can be shown that $$\Delta v_r(t) = \frac{m^2 I_r}{4\omega_e C_{dc,r}}\Delta\Theta_r \sin(\omega_e t - 90°) \qquad (22)$$

$$\Delta i_r(t) = \frac{1}{2}\Delta I_r \sin\omega_i t \qquad (23)$$

where $\Delta I_r$ and $\omega_i$ are the amplitude and frequency of perturbation in $i_r(t)$, $\Delta\Theta$, and $\omega_e$ are the amplitude and frequency of perturbation in $\theta_r(t)$.

In addition, two describing functions, $D_i(s)$ and $D_\theta(s)$ for studying the variations of $v_r(t)$ with respect to $i_r(t)$ and $\theta_r(t)$ are derived as $$D_i(s) = \frac{\Delta v_r(s)}{\Delta i_r(s)}\bigg|_{\Delta\theta_r=0} = 0, \qquad (24)$$

-continued $$D_\theta(s) = \frac{\Delta v_r(s)}{\Delta\theta_r(s)}\bigg|_{\Delta i_r=0} = \frac{m^2 I_r}{4sC_{dc,r}}$$

Figure 7:
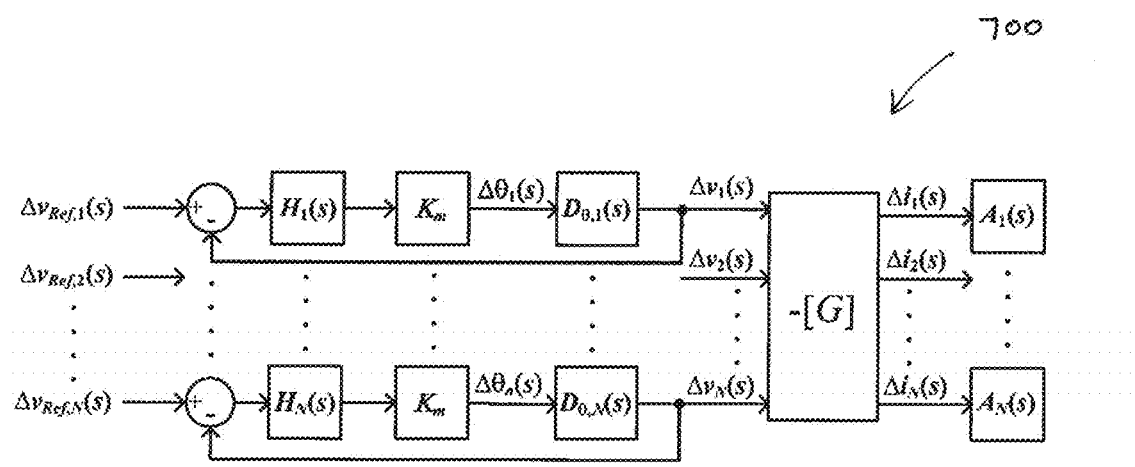
FIG. 7 is a small signal control block diagram of the power flow control apparatus of FIG. 4.

Turning now to FIG. 7, there is shown a small signal control block diagram 700 of the power flow control apparatus 402. In the control block diagram 700, a proportional-plus-integral (PI) controller $H_r$ is used to regulate the output voltage $v_r$ at the reference voltage $V_{ref,r}$ by altering the angle $\theta_r$ in each compensator unit. In one embodiment, the closed-loop transfer function of each compensator is $$F_r(s) = \frac{\Delta v_r(s)}{\Delta V_{ref,r}(s)} = \qquad (25)$$

$$\frac{H_r(s)K_m D_\theta(s)}{1 + H_r(s)K_m D_\theta(s)} = \frac{m^2 I_r K_p K_m\left(s + \frac{K_i}{K_p}\right)}{4C_{dc,r}\left(s^2 + \frac{m^2 I_r K_p K_m}{4C_{dc,r}}s + \frac{m^2 I_r K_i K_m}{4C_{dc,r}}\right)}$$

where $$H_r(s) = \left(K_p + K_i\frac{1}{s}\right),$$

in which $K_p$ and $K_i$ are the proportional gain and the integral gain of $H_r$, respectively, and $K_m=\pi/180$ is the gain of the modulator. In this embodiment, the closed-loop poles of $F_r(s)$ are all lying in the left-half s plane. This indicates the stability of the response of the power flow control apparatus.

The transient response of the power flow control apparatus is further investigated by considering the maximum overshoot $M_p$ and the settling time $t_s$.

Figure 8A:
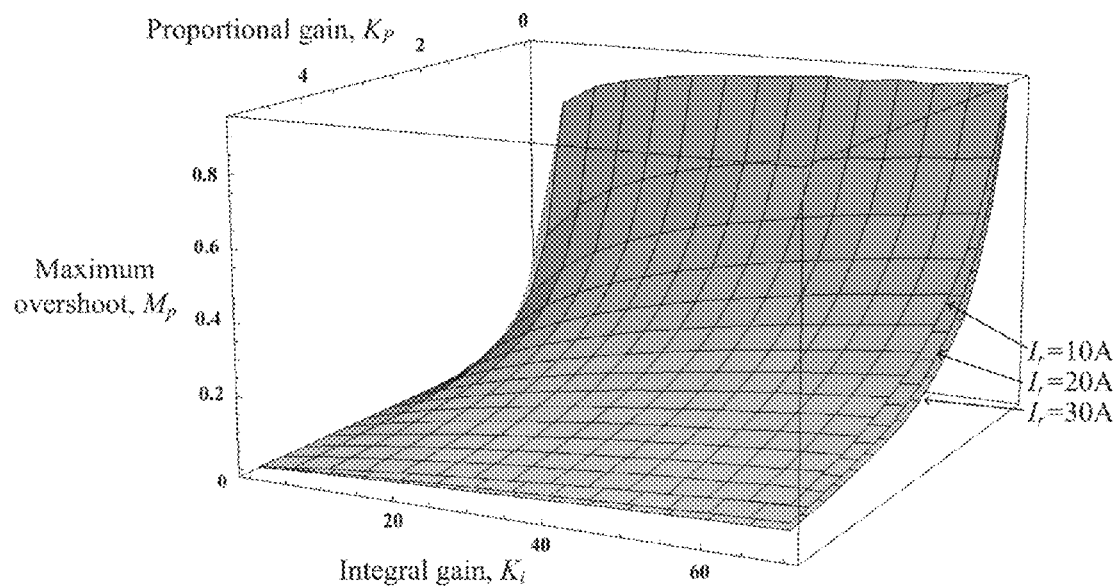
FIG. 8A is a plot illustrating the relationship of the maximum overshoot $M_p$ against the integral gain $K_i$ and the proportional gain $K_p$ of the power flow control apparatus of FIG. 4 under different values of current $I_r$.
Figure 8B:
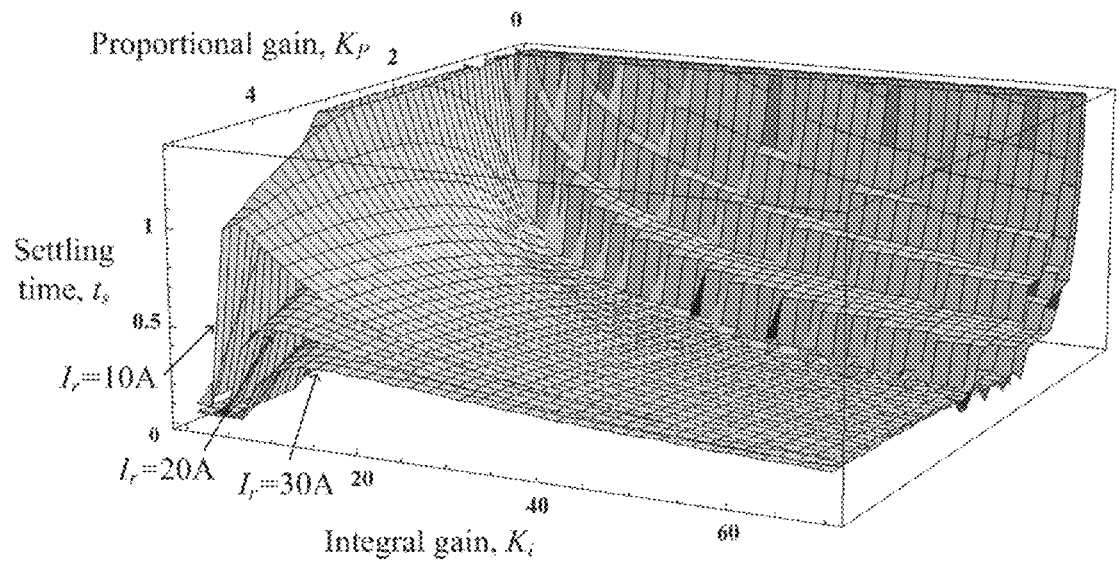
FIG. 8B is a plot illustrating the relationship of the settling time $t_s$ against the integral gain $K_i$ and the proportional gain $K_p$ of the power flow control apparatus of FIG. 4 under different values of current $I_r$.

To investigate the response of the power flow control apparatus, a step function is applied to the closed-loop transfer function $F_r(s)$ to calculate $M_p$ and $t_s$. FIG. 8A shows the relationship of the maximum overshoot $M_p$ against the integral gain $K_i$ and the proportional gain $K_p$ of the power flow control apparatus under different values of current $I_r$, whereas FIG. 8B shows the relationship of the settling time $t_s$ against the integral gain $K_i$ and the proportional gain $K_p$ of the power flow control apparatus under different values of current $I_r$. In this example, the settling time is based on the 2% criterion. By substituting equation (25) into equation (19), it can be shown that $$\Delta i(s) = -G(s)F(s)\Delta v_{ref}(s) \qquad (26)$$

where $$F(s) = \begin{bmatrix} F_1(s) & 0 & \ldots & 0 \\ 0 & F_2(s) & \ddots & \vdots \\ \vdots & \ddots & \ddots & 0 \\ 0 & 0 & \ldots & F_N(s) \end{bmatrix}$$

and $\Delta V_{ref}(s)=[\Delta V_{ref,1}(s)\ \Delta V_{ref,2}(s)\ \ldots\ \Delta V_{ref,N}(s)]^T$.

An embodiment of a design procedure of the power flow control apparatus 402 is described below.

Wither reference to FIGS. 4-6, preferably, $L_{q,r}$ and $C_{q,r}$ are designed by considering the maximum voltage drop across $v_{Lq,r}$, and the maximum current ripple $\tilde{i}_r$ respectively. More particularly, $L_{q,r}$ and $C_{q,r}$ are designed based on the criterion below:

$$L_{q,r} < \frac{v_{L_{q,r}}}{2\pi f I_r}, \quad (27)$$

$$C_{q,r} > \frac{1}{2\pi f_s \left(2\pi f_s L_{q,r} - \frac{4V_{dc}}{\pi \tilde{I}_r}\right)}.$$

With further reference to equation (21), $C_{dc,r}$ is preferably chosen to be $$C_{dc,r} = \frac{m}{8\omega} \frac{I_r}{\hat{v}_{dc,r}} \quad (28)$$

where $\hat{v}_{dc,r}$ is the peak value of the ripple voltage on $C_{dc,r}$. As for the design of transformer $T_r$, preferably, a core geometry approach method is used.

Figure 9:
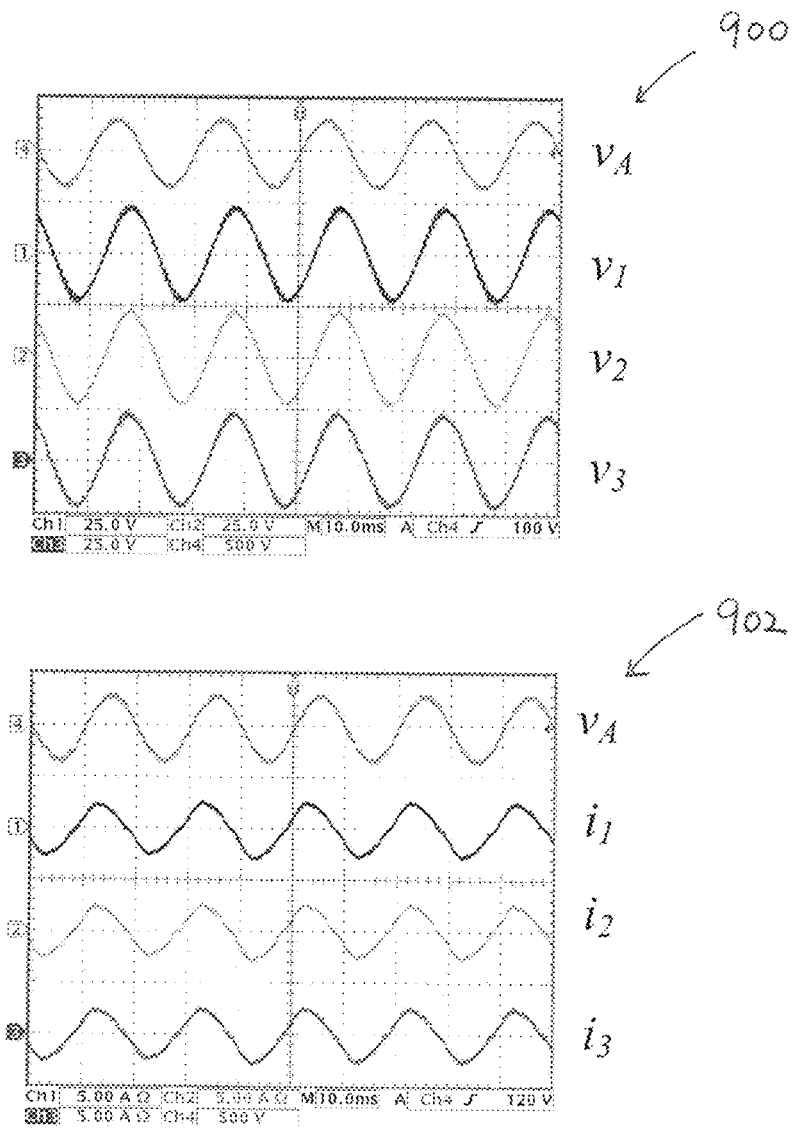
FIG. 9 is a diagram showing the steady state voltage and current waveforms of the compensator units in each branch when a power of 965 W is transferred from $v_A$ to $v_B$ through a power flow control apparatus in accordance with one embodiment of the present invention.
Figure 10:
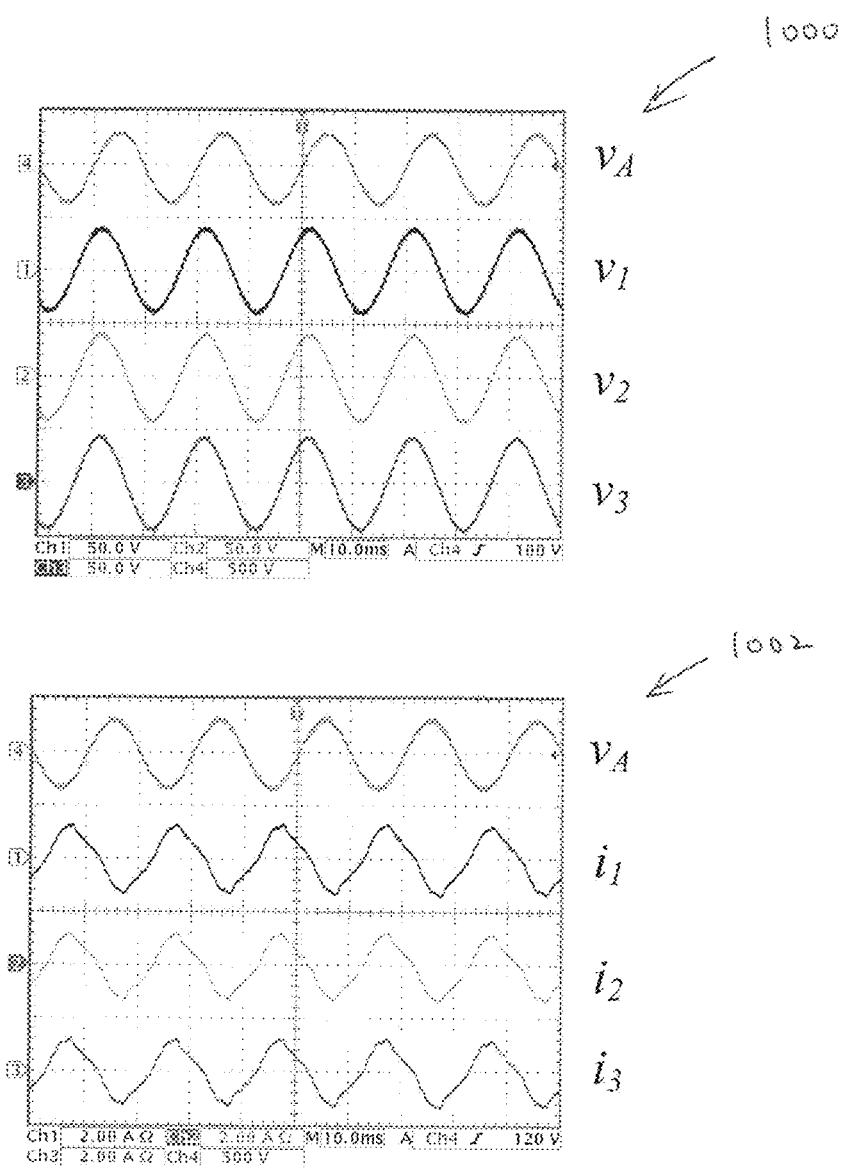
FIG. 10 is a diagram showing the steady state voltage and current waveforms of the compensator units in each branch when a power of 595 W is transferred from $v_B$ to $v_A$ through the power flow control apparatus of FIG. 9.
Figure 11:
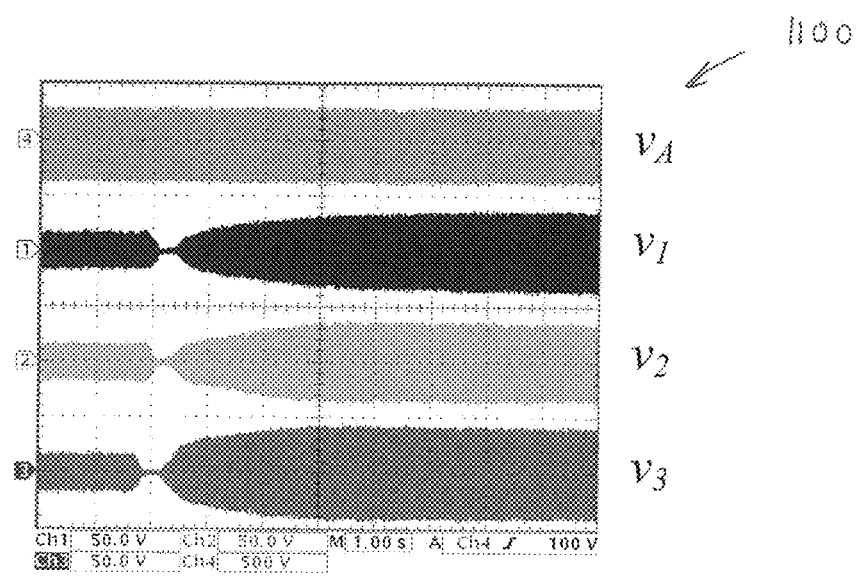
FIG. 11 is a diagram showing the transient responses of the current and voltage of the compensator units in each branch when the power flow control apparatus of FIG. 9 is changed from the operation of FIG. 9 to the operation of FIG. 10.
Figure 11:
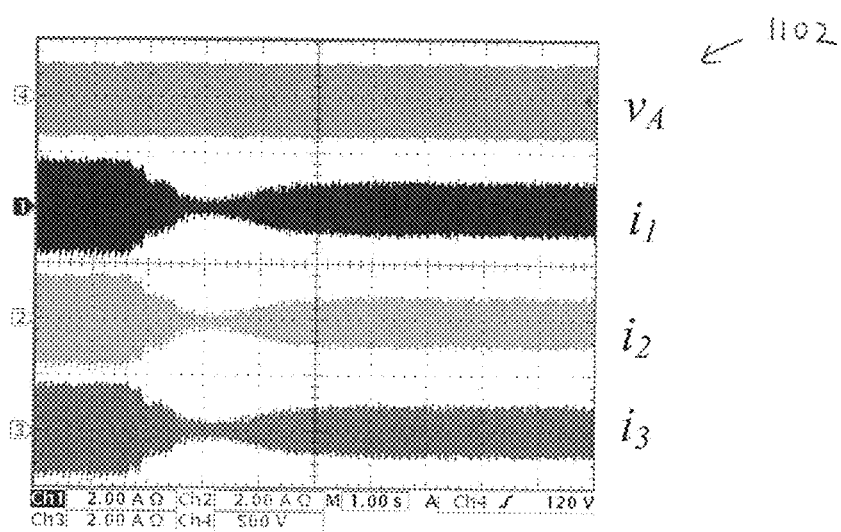

FIGS. 9-11 showed the experimental verification of the power flow control apparatus of the present invention. In particular, a testing setup with three parallel-connected SSSC using daisy-chained transformers has been built and evaluated. In this experiment, with further reference to FIG. 4, $v_A$ and $v_B$ are chosen to be 225V, 50 Hz, with phase difference of 5°. The inductance L and resistance R are chosen to be 20 mH and 0.2Ω respectively. The transformers $T_1$, $T_2$ and $T_3$ have the magnetizing inductance of 162 mH, 152 mH and 160 mH respectively. In FIGS. 9-11, $v_1$, $v_2$, $v_3$ are compensator voltages whereas $i_1$, $i_2$, $i_3$ are compensator currents.

FIG. 9 shows the steady-state voltage waveforms 900 and the steady-state current waveforms 902 of the compensator units 406 when the power transferring from $v_A$ to $v_B$ is 965 W. FIG. 10 shows the steady-state voltage waveforms 1000 and the steady-state current waveforms 1002 of the compensator units 406 when the power transferring from $v_B$ to $v_A$ is 595 W. It is observed that in this example the voltage and current waveforms of the three compensator units are similar. FIG. 11 shows the transient voltage waveforms 1100 and transient current waveforms 1102 of the compensator units 406 when the power flow control apparatus is changed from the operation of FIG. 9 to the operation of FIG. 10. It is observed that the transient response of the compensator currents and voltages gradually decays and a stable steady state response is obtained. More importantly, these results are in agreement with the modelling and analysis of the power flow control apparatus described above.

In summary, an embodiment of a power flow control apparatus based on connecting multiple units of SSSC in parallel to form a modular-based multi-parallel-connected SSSC (MSSSC) architecture has been described. Particularly, the power flow control apparatus also comprises a daisy chained transformer structure. The presented power flow control apparatus of this invention may be advantageous in that it enables the concept of "plug- and produce", i.e. the apparatus has a high degree of modularity, scalability, adaptability and autonomic behaviour. In a particular embodiment, each SSSC compensator unit in the MSSSC is coupled to one another through a coupling transformer so as to make each unit share the transmission current equally.

In some applications, such modular approach allows consumers on the demand side to flexibly optimize and manage the power flow in the microgrid and manufacturers to produce standardized low-power units for distributed power system. Moreover, in some embodiments, each SSSC unit is fully autonomous, as it will self-regulate the injection (compensating) voltage after receiving the command from the advanced metering infrastructure. Advantageously, in situations when one of the SSSC units malfunctions, the other SSSC units will not be affected and the power flow control apparatus can still function with a lower power transfer.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A power flow control apparatus adapted to be arranged between a first power source and a second power source, the power flow control apparatus comprising:
   a current distribution circuit arranged to distribute an input current received from the first power source into a plurality of branches, such that the input current is distributed into a plurality of branch currents, wherein each of the plurality of branches includes an inductive arrangement arranged to form an inductive coupling with an associated inductive arrangement of at least one other associated branch; and
   a plurality of compensator units arranged in the plurality of branches, each of the plurality of compensator units is arranged to deliver a respective branch compensating voltage so as to alter an output voltage of the power flow control apparatus to thereby regulate power flow between the first power source and the second power source;
   wherein the plurality of compensator units are arranged to operate in substantially the same phase such that the plurality of branch currents have substantially the same phase in steady state.

2. The power flow control apparatus in accordance with claim 1, wherein the plurality of compensator units are disposed downstream of the current distribution circuit.

3. The power flow control apparatus in accordance with claim 2, wherein each of the plurality of compensator units is arranged to regulate its respective branch compensating voltage.

4. The power flow control apparatus in accordance with claim 2, wherein each of the plurality of compensator units is further arranged to automatically regulate its respective branch compensating voltage in response to a command.

5. The power flow control apparatus in accordance with claim 4, wherein the power flow control apparatus is further arranged to provide an output voltage based on the branch compensating voltages of the plurality of compensator units.

6. The power flow control apparatus in accordance with claim 1, wherein the power flow control apparatus is arranged on a transmission line between the first power source and the second power source.

7. The power flow control apparatus in accordance with claim 1, wherein the inductive arrangement of each of the plurality of branches comprises a first coil and a second coil.

8. The power flow control apparatus in accordance with claim 7, wherein the first coil of one branch is inductively coupled with the second coil of an adjacent branch.

9. The power flow control apparatus in accordance with claim 7, wherein the first coil of one branch and the second coil of an adjacent branch together defines a transformer unit.

10. The power flow control apparatus in accordance with claim 9, wherein the first coils are primary coils of the transformer units and the second coils are secondary coils of the transformer units.

11. The power flow control apparatus in accordance with claim 10, wherein each of the primary coils comprises a respective first number of turns of coils, and each of the secondary coils comprises a respective second number of turns of coils.

12. The power flow control apparatus in accordance with claim 11, wherein each transformer unit of the current distribution circuit has a turn ratio defined by the respective first number of turns of coils of the respective primary coil and the respective second number of turns of coils of the respective secondary coil.

13. The power flow control apparatus in accordance with claim 9, wherein the number of transformer units equals the number of branches.

14. The power flow control apparatus in accordance with claim 9, wherein the number of compensator units equals the number of transformer units.

15. The power flow control apparatus in accordance with claim 9, wherein the transformer units are connected in a daisy-chained manner.

16. The power flow control apparatus in accordance with claim 1, wherein a summation of the individual branch current of each of the plurality of individual branches of the current distribution circuit is substantially equal to the input current.

17. The power flow control apparatus in accordance with claim 1, wherein each of the plurality of compensator units is a static synchronous series compensator (SSSC) with a voltage source converter.

18. The power flow control apparatus in accordance with claim 17, wherein each static synchronous series compensator is further arranged to regulate its branch compensating voltage.

19. The power flow control apparatus in accordance with claim 18, wherein each static synchronous series compensator is further arranged to automatically regulate its branch compensating voltage in response to a command.

20. The power flow control apparatus in accordance with claim 19, wherein the power flow control apparatus is arranged to provide an output voltage based on the branch compensating voltages of the static synchronous series compensators.

21. The power flow control apparatus in accordance with claim 1, wherein the number of compensator units equals the number of branches.

* * * * *